Patented Oct. 2, 1951

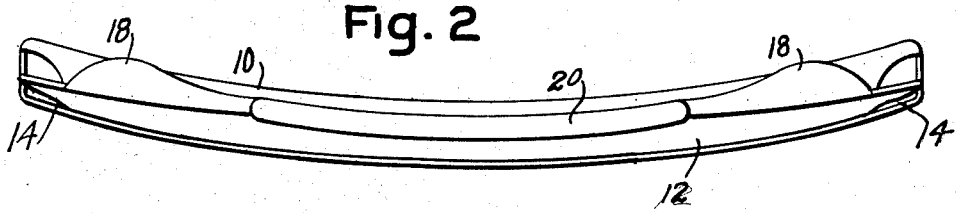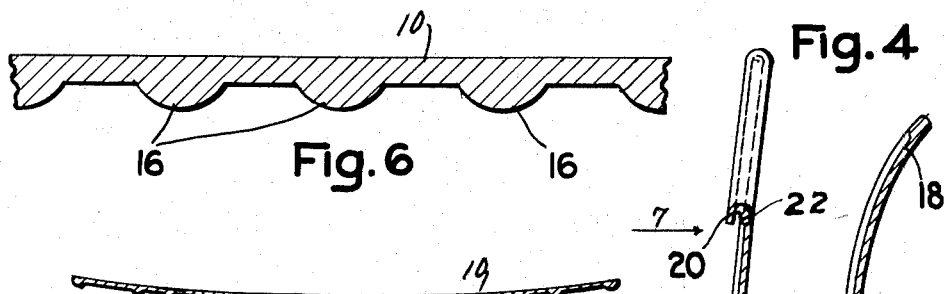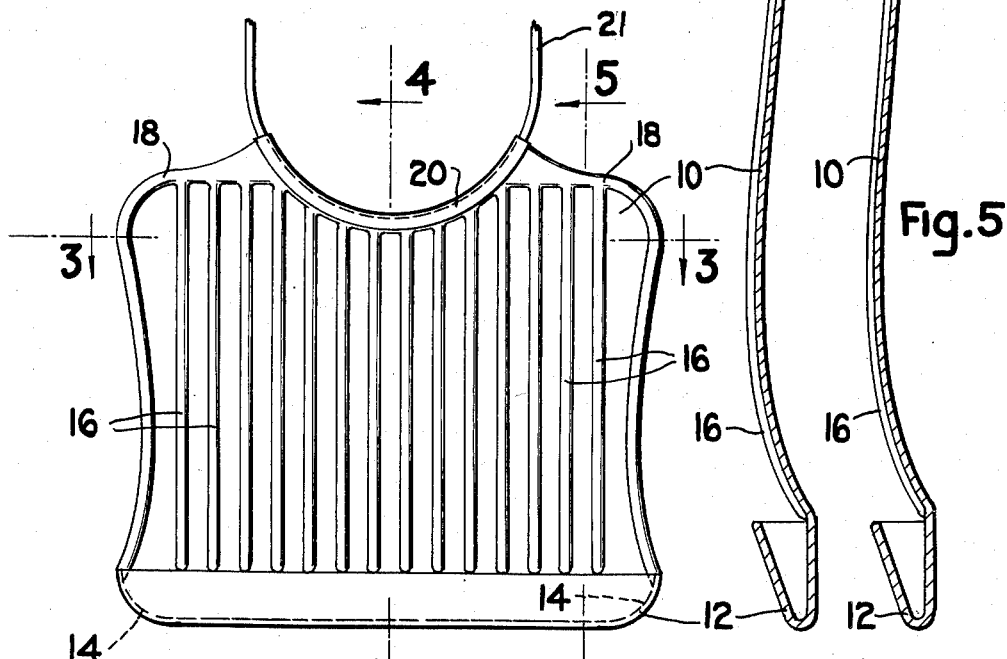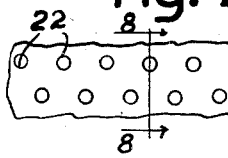
INVENTOR.
James R. Arseneault

2,569,915

UNITED STATES PATENT OFFICE 2,569,915

CHILD'S BIB

James R. Arseneault, Worcester, Mass., assignor to Olive L. Buell, Worcester, Mass.

Application May 13, 1949, Serial No. 93,075

2 Claims. (Cl. 2—49)

This invention relates to improvements in children's bibs or dickies and the principal object of the invention is to provide an efficient, easily cleaned device of the class described which is made of molded plastic or the like, either rigid or semi-rigid.

One of the main advantages of the new bib resides in the fact that the same is provided with corrugations at one side thereof so that spilled food and liquids will run substantially straight down the bib and will not splash sideways, the bib or dickey being provided with an easily cleaned trough at the bottom for catching spilled materials running down between the corrugations.

Other objects of the invention include the provision of a bib or dickey of the class described which is anatomically molded and shaped to the general form of the wearer so that it may be rigid or semi-rigid, and yet is easily held in position by a neck band and will carry out the objects of the invention as to catching spilled materials and at the same time will be easily attached and easily removed for cleaning.

Other objects and advantages of the invention will appear hereinafter.

Reference is to be had to the accompanying drawing in which

Fig. 1 is a view in front elevation of a device according to the present invention;

Fig. 2 is a top plan view thereof;

Fig. 3 is a section on line 3—3 of Fig. 1;

Fig. 4 is a section on line 4—4 of Fig. 1;

Fig. 5 is a section on line 5—5 of Fig. 1;

Fig. 6 is an enlarged section through the bib illustrating the corrugations which are located at one side thereof;

Fig. 7 is an enlarged detail in front elevation of a part of the bib looking in the direction of arrow 7 in Fig. 4; and Fig. 8 is a section on line 8—8 of Fig. 7.

The present invention is shown in its entirety in Fig. 1 and comprises a main portion 10 which is a bib or dickey shaped, as clearly shown by the top plan view and the sectional views, to the anatomy of the wearer, and having at the bottom portion thereof an up-turned trough 12 to catch spilled food and the like running down the front of the bib. It will be apparent that by being smooth as is the case of molded plastic products, the same will be very easily cleaned by merely rinsing and this is even true of the trough 12 which is preferably provided with rounded interior corners 14 which cannot catch and harbor food particles when the trough is rinsed off so that the device will be seen to be always clean merely by rinsing.

The front of the device is provided with a series of vertical outstanding ribs 16 which are located at the forward or convex side thereof for the purpose of preventing sideways or lateral splashing of foods and liquid which may be dropped on the bib from above in the usual manner. Such foods and liquids will be directed downwardly to the trough above described to be retained therein until washed out.

The bib is provided with a pair of shoulder portions 18 which, as seen in Figs. 2 and 5, extend reversely toward the wearer so as to conform to the shoulders of the infant and between these shoulders, there is provided a curved flange-like guard to preclude any cutting or injury to the child's neck. A neck tape 21 secures the device to the wearer.

As is clearly shown in the drawings, the present device is concaved both in a vertical plane and in a horizontal plane so as to fit the anatomy of the wearer. Hence, all food dropped will be caught and the present bib cannot become folded or creased or otherwise disarranged so as to fail to cover the wearer's front.

To provide for liquids which may run down the wearer's chin or from the corners of the mouth to the neck, inside the bib, small holes 22 may be provided at the neck location, see Fig. 4, to direct such liquids to the outside surface of the bib and down the front, as above described. These holes are shown in Figs. 7 and 8. Holes 22 may slant down from the rear to the front, to assist the tendency of the liquid to be so directed, and are staggered in rows to essentially cover the width of the bib at the front.

It will be seen that the present invention provides a relatively inexpensive molded plastic bib or dickey of the class described which will be more efficient than prior art devices because all of the dropped food particles and liquids will eventually fall into the trough, the latter being very easily cleaned, as distinguished from devices heretofore known.

Having thus described my invention and the advantages thereof, I do not wish to be limited to the details herein disclosed otherwise than as set forth in the claims, but what I claim is:

1. A bib of the class described comprising a protective sheet conforming to the chest and stomach of a user, a trough along an edge of the sheet at the bottom, a flange at the top, vertical ribs on the sheet directing material straight down therebetween to the trough, the sheet at the flange being apertured for liquids to be directed from the rear of the sheet to the front, said apertures being staggered in rows and slanting down from the rear to the front.

2. A bib comprising a molded flexible plastic concave-convex sheet, said plastic sheet having sufficient rigidity to hold the shape thereof under normal conditions of use but yieldable to pressure, a shallow trough at the bottom edge of the sheet at the convex side thereof, an outstanding neck flange at the top edge of the sheet at the convex side, a closely spaced series of ribs at the convex side of the sheet extending lengthwise of the sheet from the flange to the trough, the latter having rounded interior corners, said ribs forming open ended grooves leading directly into the trough.

JAMES R. ARSENEAULT.

REFERENCES CITED

The following references are of record in the file of this patent:

UNITED STATES PATENTS

| Number | Name | Date |
| --- | --- | --- |
| D. 152,879 | Grassi | Mar. 1, 1949 |
| 632,863 | Blank | Sept. 12, 1899 |
| 733,303 | Van Agnew | July 7, 1903 |

FOREIGN PATENTS

| Number | Country | Date |
| --- | --- | --- |
| 206,719 | Great Britain | Nov. 15, 1923 |